(12) United States Patent
Glinski et al.

(10) Patent No.: US 6,934,675 B2
(45) Date of Patent: Aug. 23, 2005

(54) METHODS AND SYSTEMS FOR ENABLING SPEECH-BASED INTERNET SEARCHES

(76) Inventors: Stephen C. Glinski, 3607 Cricket Cir., Edison, NJ (US) 08820; Michael K. Brown, 285 Lewis St., Plainfield, NJ (US) 07060

(*) Notice: Subject to any disclaimer, the term of this patent is extended or adjusted under 35 U.S.C. 154(b) by 707 days.

(21) Appl. No.: 09/879,892

(22) Filed: Jun. 14, 2001

(65) Prior Publication Data

US 2002/0194004 A1 Dec. 19, 2002

(51) Int. Cl.$^7$ .......................... G10L 21/06; G10L 15/26
(52) U.S. Cl. ........................ 704/9; 704/10; 704/270; 704/275
(58) Field of Search ................ 704/270, 275, 704/256, 257, 248, 246, 2, 9, 10; 707/3, 6

(56) References Cited

U.S. PATENT DOCUMENTS

| | | | | |
|---|---|---|---|---|
| 5,519,608 A | * | 5/1996 | Kupiec | 704/9 |
| 5,675,704 A | * | 10/1997 | Juang et al. | 704/246 |
| 5,687,287 A | * | 11/1997 | Gandhi et al. | 704/247 |
| 6,052,662 A | * | 4/2000 | Hogden | 704/256 |
| 6,161,090 A | * | 12/2000 | Kanevsky et al. | 704/246 |
| 6,233,544 B1 | * | 5/2001 | Alshawi | 704/2 |
| 6,272,463 B1 | * | 8/2001 | Lapere | 704/248 |
| 6,430,551 B1 | * | 8/2002 | Thelen et al. | 707/3 |
| 6,510,417 B1 | * | 1/2003 | Woods et al. | 704/275 |
| 6,615,172 B1 | * | 9/2003 | Bennett et al. | 704/257 |
| 6,625,600 B2 | * | 9/2003 | Lyudovyk et al. | 707/6 |
| 6,633,846 B1 | * | 10/2003 | Bennett et al. | 704/257 |
| 6,665,640 B1 | * | 12/2003 | Bennett et al. | 704/257 |

OTHER PUBLICATIONS

N–Grams: "Statistical Methods for Speech Recognition" MIT Press, 1997, pp. 60–62, by Frederick Jelinek.

"Similarity–based Estimation of Word Occurrence Probabilities." Proceedings of the 32nd Annual Meeting of Association Computer Linguistics, 1994, pp. 272–278 by I. Dagan, F. Pereira and L. Lee.

"Automatic Speech Recognition," Kluwer Academic Publishers, Chapters 1–6, 1992, by Kai–Fu Lee.

Parshing Natural Language, Academic Press, All Chapters, 1983, by Margaret King.

"Syntactic Pattern Recognition and Applications," Prentice–Hall, Chapter 7, 1982 by King Sun Fu.

* cited by examiner

*Primary Examiner*—Susan McFadden
(74) *Attorney, Agent, or Firm*—Birch, Stewart, Kolasch & Birch, LLP

(57) ABSTRACT

Merged "grammars" derived from statistical indicators (e.g., N-grams and cohorts) are used to enable speech-based, Internet searches.

50 Claims, 4 Drawing Sheets

FIG. 4

| VOC SIZE | N=1 | N=2 | N=3 |
|---|---|---|---|
| 50K | 50K | 2.5G | 125T |
| 25K | 25K | 625M | 15.6T |
| 10K | 10K | 100M | 1T |
| 5K | 5K | 25M | 125G |

FIG. 5

| WORD 1 | SYNONYM 1 | SYNONYM 2 | SYNONYM 5.1 | SYNONYM 5.2 | CONJUGATE 1 | CONJUGATE C.1 |
| WORD 2 | SYNONYM 1 | SYNONYM 2 | SYNONYM 5.1 | SYNONYM 5.2 | CONJUGATE 2 | CONJUGATE C.2 |
| ... | ... | ... | ... | ... | ... | ... |
| WORD W | SYNONYM 1 | SYNONYM 2 | SYNONYM 5.W | SYNONYM 5.W | CONJUGATE W | CONJUGATE C.W |

10b, 10c, 10a, 10d

METHODS AND SYSTEMS FOR ENABLING SPEECH-BASED INTERNET SEARCHES

BACKGROUND OF THE INVENTION

Presently, the most common way to conduct a search using the Internet is to type in the letters or text of a search term using a keyboard of some sort. Some have tried to introduce methods which allow users to initiate Internet searches using spoken, not typed in, words. To date these methods have not been successful. Sometimes existing methods fail to produce worthwhile search results. Other times no results (i.e., no match for a search) are obtained at all.

The inadequacies of existing methods can be linked to a number of reasons. Often times the reason lies with how the method or system is structured.

Because of the way they are structured, most methods are not capable of generating worthwhile search results when a spoken search term is not an exact match, or a close approximation of, a stored reference word. When a spoken search includes a combination of words, some methods are structured to generate results only if a match for the exact combination of words is found.

Other times, the spoken search term (e.g., word) may be in the wrong syntax or tense or maybe somewhat mispronounced. So, even though a method may generate results when a term such as "driving" is used, when a conjugate form "drove" is used or when "driving" is spoken by a person with a heavy accent no results are generated.

The upshot is that it is very difficult for an individual to launch one search embodying a concept or idea expressed as a word or words. Instead, the idea or concept becomes "enslaved" to the literal appearance of a combination of words.

In sum, existing methods and systems are not flexible enough to generate search results given the wide variety of ways in which an idea may be communicated.

Accordingly, it is desirable to provide methods and systems for enabling speech-based, Internet searches which are flexible enough to generate of search results from a wider variety of communications as compared to existing techniques.

Other desires will become apparent from the drawings, detailed description of the invention and claims that follow.

SUMMARY OF THE INVENTION

In accordance with the present invention, there are provided methods, systems, programmed devices and databases for enabling speech-based, Internet searches.

The present invention envisions the generation of a merged word or phoneme grammar based on statistical measures, such as cohort probabilities and N-gram probabilities.

Phonemes associated with spoken words contained in speech-based, Internet searches are compared against either grammar to identify documents, web sites, or web pages (collectively "web sites") which contain words which match, or are correlated to, the spoken words.

The present invention and its advantages can be best understood with reference to the drawings, detailed description of the invention and claims that follow.

BRIEF DESCRIPTION OF THE DRAWINGS

FIG. 4 depicts estimates for the size of some merged grammars.

FIG. 5 depicts a database containing synonyms and conjugates which may be used to complete a speech-based, Internet search according to one embodiment of the present invention.

DETAILED DESCRIPTION OF THE INVENTION

Figure 1:
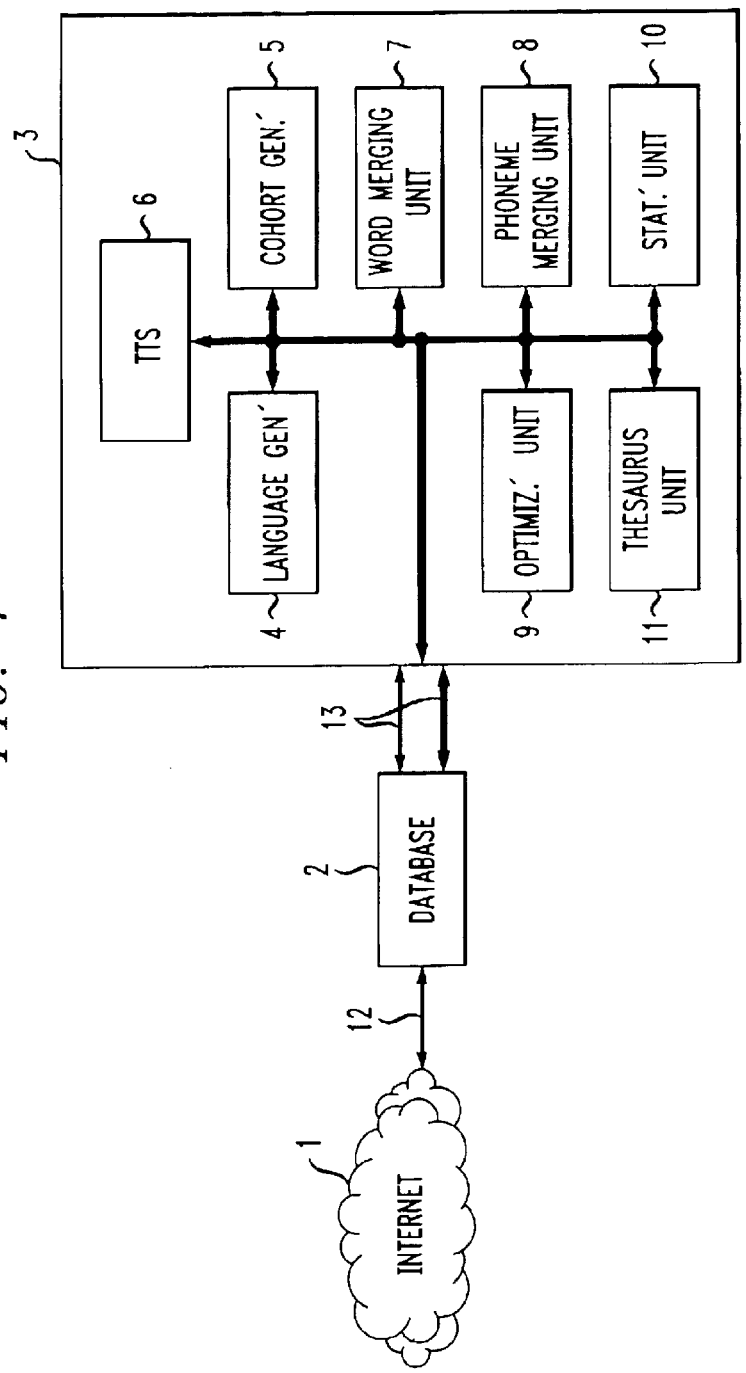
FIG. 1 depicts an illustrative example of a grammar generator according to one embodiment of the present invention.

Referring to FIG. 1, there is shown a grammar generation unit or generator 3 according to one embodiment of the present invention. The role of the grammar generator 3 is to generate one or more "grammars" which can be used to enable speech-based, Internet searches. Generally speaking, a "grammar" comprises a group of words (sometimes referred to as a vocabulary) and a set of rules which govern how the words can, or cannot, be used together. The generator 3 may be used to generate both a "word" grammar and a "phoneme" grammar.

In an illustrative embodiment of the present invention, one method of generating these grammars is as follows.

Periodically, a collection and database unit 2 is adapted to launch textual searches of the Internet 1 via link 12. One way to launch a textual search is by using a program referred to as a "spider". As is known by those skilled in the art, spiders are programs which are executed in order to collect information from web sites located within the Internet 1. The information which is collected from such searches is stored within unit 2. It should be understood that each time a textual search of the Internet 1 is made, the information is used to update unit 2.

The information retrieved by the spider may take many forms. In one embodiment of the invention the information comprises at least words or word combinations (hereafter collectively referred to as "words") found in such web sites and the associated addresses of these web sites.

In one embodiment of the present invention, the grammar generator 3 may comprise a "text-to speech" converter 6 ("TTS" for short) adapted to convert words into "phonemes". Phonemes represent the basic, audible sounds of a given language (e.g., English). Typically, the number of phonemes used to represent the English language is somewhere between 25 and 50. In one embodiment of the present invention, TTS 6 is adapted to use 41 phonemes to represent the basic sounds of the English language.

The TTS 6 can be used in generating a "phoneme grammar" among other things. For example, the TTS 6 may be used to retrieve words from database 2 and to convert the words into phonemes. Subsequently, these phonemes can be used to generate a phoneme grammar. The TTS 6 can also be adapted to convert a word grammar into phonemes. More on each of these later. For now, we turn to the generation of a word grammar.

In an illustrative embodiment of the present invention, the generator 3 comprises a cohort generation unit or generator 5 and a language generation unit or generator 4 for generating cohorts and a "language" respectively. In one embodiment of the present invention, the language generator 4 comprises an N-gram generator for generating N-grams.

A statistical "N-gram" is a group of "N" words with a corresponding statistical value which indicates the "probability" that a group of words will appear together. See for further background on N-grams, "N-Grams: Statistical Methods for Speech Recognition," Frederick Jelinek, MIT Press, 1997, pp 60–62). For example, the phrase "the little brown fox jumped over the fence" contains 8 words. Greatly simplified, the five words "fox jumped over the fence" would be a 5-gram (i.e., N=5).

In a sense then, the generator 4 is adapted to receive the information stored in database unit 2, detect the word combinations or word groupings contained therein, and use this information to assign a probability to each word combination/grouping. Greatly simplified, the word combinations that are detected make up a set of N-grams. The number of times each word combination is detected or counted determines the "probability" or count. An "N-gram (or cohort) probability" is a measurement of how many times a given word combination occurs (e.g., is counted) in a given set of information.

As just noted, one language generated by generator 4 comprises N-grams. It should be understood that the present invention is not so limited, however. Other "languages" such as finite state, context free and/or a context sensitive language can be generated by the generator 4. To simplify the explanation which follows, we will assume that the generator 4 generates an N-gram based language.

As mentioned above, the unit 3 also comprises a cohort generator 5. A "cohort" is another measurement of the occurrence of a given word with respect to another word. However, while an N-gram probability indicates the number of times a word occurs within a close proximity of another word, cohorts are not so limited. Instead, a "cohort probability" is a measurement which indicates the number of times a word will occur within a broader range, outside a close proximity, of another word. In short, the range within which words must appear to be counted as a cohort is much greater than an N-gram. Those skilled in the art may recognize the term "co-occurrences." It should be understood that the use and meaning of "cohorts" herein is substantially synonymous with co-occurrences (for further background on "co-occurrences" see Dagan, I., Pereira, F. and Lee, L., "Similarity-based estimation of word cooccurence probabilities," Proceedings of the $32^{nd}$ Annual Meeting of the Association for Computational Linguistics, 1994, 272–278.) As was the case with the language generator 4, the cohort generator 5 is adapted to retrieve information from database 2 and to generate cohorts from this information.

Throughout this discussion the terms "N-gram" and "cohort" will be used as shortened phrases for N-gram probability and cohort probability, respectively.

At this point the generator 3 has, in effect, received information about substantially all of the words found in all of the web sites searched by the spider, and has generated probabilities which reflect the number of times words appear (i.e., N-grams and cohorts). In an alternative embodiment of the present invention, the units 4,5 may be further adapted to detect whether a word is being used as a noun or verb or, more generally, what "part of speech" (e.g., noun, verb, adjective, etc. . . . ) the word relates to (i.e., how the word is used grammatically). For example, the word "record" may be used as a noun, e.g., your record consists of your high school grades, or as a verb, e.g., to record your grades we need your exam results. Once the part of speech is detected, a unique part-of-speech indicator associated with that part can be stored in a unit 4,5 along with the N-grams/cohorts and web site addresses.

After the N-grams and cohorts are generated by units 4 and 5, respectively, the unit 3 is further adapted to generate a merged "word grammar". The unit 3 further comprises word merging unit 7 adapted to receive the N-grams and cohorts (along with the associated web site addresses and part-of-speech indicators) and to merge the two into one merged, word grammar. Though different, N-grams and cohorts are similar enough that the merging process is straightforward. In one embodiment of the invention, the N-grams and cohorts are added together to form a merged grammar.

The word merging unit 7 may further comprise a memory or storage section for storing the merged grammar. In an alternative embodiment of the present invention, the merged grammar may be stored in a separate memory or storage unit.

Up until now, it is believed that existing systems rely heavily on N-grams and not on the combination of N-grams and cohorts. By generating a merged grammar, the present invention is more flexible. For example, if a system merely uses N-grams, and a word falls outside the range of the N-gram (where the range is limited to being within a close proximity of a reference word, e.g., exact sequence), it becomes difficult to measure whether a given word is being used with another to convey the same or similar idea. In contrast, because cohorts comprise much broader ranges than N-grams, methods and systems envisioned by the present invention are capable of detecting whether the same idea embodied in a search is conveyed by a group of words which happen to be located outside a close proximity (i.e., at a distance) to one another. The generation of a grammar which comprises both N-grams and cohorts, in effect, constitutes a grammar that comprises more "ideas" (as compared to just words) than existing grammars.

As mentioned above, the generator 3 generates two grammars: a word grammar and a phoneme grammar. To the latter we now turn.

We have previously discussed the conversion of words found by the spider into phonemes by the TTS 6. In one embodiment of the present invention, the TTS 6 may be adapted to both generate the phonemes based on words retrieved from database 2 and to forward the phonemes (and the associated web site addresses) to the language (e.g., N-gram) and cohort generators 4,5.

Upon receiving the phonemes, the generators 4,5 are adapted to generate phoneme-based N-grams and phoneme-based cohorts, respectively. If desired, part-of-speech identifiers may also be generated at this time. Thereafter, phoneme merging unit 8 is adapted to receive these phoneme-based N-grams and cohorts and to generate a merged, phoneme grammar.

There exists more than one type of phoneme or phonetic lexicon. To account for this, the present invention envisions phoneme merging units adapted to generate any one of many merged phoneme grammars, such as Arpabet, World English Spelling or an International Phonetic Alphabet, to name a few.

At this point, both merged word and merged phoneme based grammars have been generated. In one embodiment of the present invention, either one or both merged grammars may now be used to complete speech-based, Internet searches. Overly simplified, this requires that words spoken by someone wishing to conduct a search be compared to the word and/or phoneme grammars. Before turning to a discussion of how this is achieved, it is worth noting some additional aspects of the present invention. As is apparent, the generator 3 is capable of generating two grammars, word or phoneme. It should be understood that the present invention envisions generators where only one, or both, are generated. The decision to generate one or the other may be based on many factors. In general, a word grammar takes up less memory than a phoneme grammar. On the other hand, because phonemes are related to the representations of an audible sound not text, a phoneme grammar may be more effective in returning search results when partial sounds, mis-pronunciations, or accented syllables are spoken. As explained in more detail below, the phoneme grammar is compared against the spoken words. Because, in a sense, this is a comparison of sounds versus a set of probable sound patterns, there is a greater chance of finding a match. In contrast, a word grammar necessarily represents text, not sounds. If a spoken word is not pronounced clearly, a comparison of such a spoken word with a word grammar may result in no matches.

Viewed from a user's perspective, a phoneme grammar may return more matches (e.g., web sites) than a word grammar, though the matches may contain web sites where words are not used in the same context as a spoken, search term.

Other aspects of the present invention are aimed at reducing the size of the word and/or phoneme grammars. In general, the smaller the grammar, the faster a speech-based search can be completed.

In an alternative embodiment of the present invention, the generator 3 may additionally comprise an optimization unit 9 and a web site statistical unit 10. Units 4–8 may instruct one or more of the units 9,10 to assist it. For example, many times the language (e.g., N-grams) or cohorts generated by units 4,5 contain duplicates. In an illustrative embodiment of the present invention, during the generation of a grammar, units 7,8 may instruct the optimization unit 9 to remove any redundant or repetitive parts of the language (e.g., N-grams) or cohorts. This helps reduce the size of a grammar.

Units 4–8 may also call upon statistical unit 10. In one embodiment of the present invention, the statistical unit 10 is adapted to further reduce the size of a grammar by eliminating parts of a language (e.g., N-grams) or cohorts derived from web sites (i.e., those queried by the spider during the collection of words) with little or no traffic flow. In more detail, statistical unit 10 is adapted to receive information about the popularity of different web sites. If a given web site is unpopular (i.e., has low traffic flows), the statistical unit 10 is adapted to eliminate the N-grams or cohorts associated with that web site so that it will not be used in generating a grammar.

It should be understood that the statistical unit 10 is capable of eliminating N-grams and cohorts because each N-gram and cohort is associated with a given web site. Recall that when the spider builds database 2, it retrieves words and the identity (e.g., web site address) of the web sites where the words were found. In a sense, each retrieved word is "tagged" with its associated web site address. Thereafter, these tags continue to be associated with the N-grams, cohorts and grammars generated from such words. Because an N-gram or cohort may be associated with more than one word, each N-gram or cohort may end up being associated with more than one web site. Thus, at any given time there may exist both a word and/or phoneme grammar, the contents of which may be associated with a number of web sites.

Figure 2:
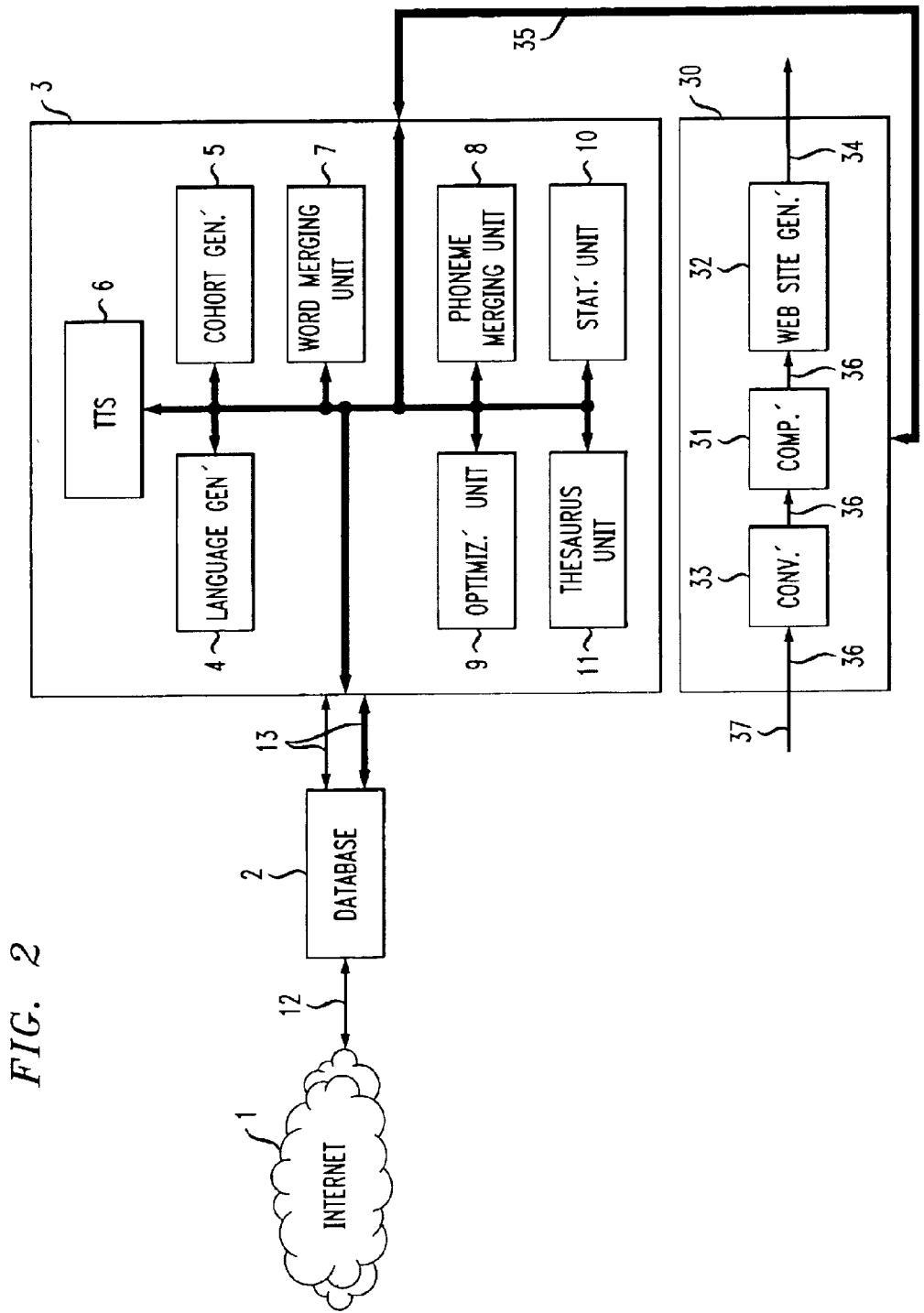
FIG. 2 depicts an illustrative example of a speech-based, Internet search system which comprises a grammar generator and a speech recognition unit according to one embodiment of the present invention.

Referring now to FIG. 2, there is shown a combination of a grammar generator 3 and speech recognition unit or recognizer 30. Speech recognition unit 30 comprises a conversion unit 33, comparison and/or parsing unit 31, and a web site address generator or unit 32. An example of how the generator 3 and recognizer 30 work together to initiate a speech-based, Internet search is as follows. A user speaks a given phrase into a microphone (not shown). The microphone or other circuitry (e.g., codecs, digitizers) generates sound patterns, which are thereafter input into the recognizer 30 via pathway 37. The sound patterns comprise the frequency spectra of a word or words.

In an illustrated embodiment of the present invention, the conversion unit 33 is adapted to receive the frequency spectra and to convert the spectra into one or more "possible" phonemes using techniques known in the art (see for further background, "Automatic Speech Recognition," Kai-Fu Lee, Kluwer Academic Publishers, 1992, Chapters 1 through 6).

In more detail, because the unit 30 does not know beforehand what words will be spoken and therefore cannot know what the spectra is (i.e., the exact frequencies making up the words), the unit 33 is adapted to generate a set of possible or partial phonemes, (collectively "possible") one of which might match the spectra associated with a spoken word. The unit 33 is adapted to generate hundreds or thousands of sets of possible phonemes each second.

It should be understood that the spectra are one of many representations, forms or values (collectively "forms") which may be generated by the unit 33 which are associated with the spoken words. Whichever form is generated, it is this form which is used to generate a set of possible phonemes.

Before going further it should be understood that many existing systems do not generate a set of possible phonemes as in the present invention. Instead, they attempt to generate one phoneme (i.e., the one determined, somehow, to be the best). This does not mean that the phoneme selected was correct. To the contrary, it may be incorrect. Rather, it is just a best guess.

Instead of limiting the number of phonemes, the present invention holds out the possibility that one of many may be the correct one. It is these "many", possible phonemes which will be compared against a grammar, not just one. Because of this, there is a greater chance that a correct match will result using the techniques of the present invention.

Though the conversion unit 33 is shown as a part of the recognizer 30, the invention is not so limited. In many cases, the conversion unit 33 will be separated from the recognizer 30.

In an illustrative embodiment of the invention, the set of possible phonemes is compared against the word grammar or phoneme grammar. More specifically, unit 31 is adapted to receive the possible phonemes via pathway 36 and at least a merged, phoneme or word grammar from unit 7 or 8 via pathway 35. Either merged grammar comprises both merged N-grams and cohorts. When a word grammar is used by unit 31, it should be understood that this grammar must be converted into phonemes by a converter, such as TTS 6.

The unit 31 is further adapted to determine whether there is a match between any of the possible phonemes and any of the N-grams or cohorts making up the merged grammar.

Remembering that each N-gram and cohort is associated with one or more web sites, this comparison, in effect, determines whether any of the web sites searched by the spider contain words which match the words spoken. More to the point, then, this comparison determines whether any of the web sites searched by the spider contain words which match any one of a number of possible phonemes input into the unit 31.

To be sure, a user will input a specific word or phrase to initiate a search. This fact notwithstanding, the present invention envisions generating one or more possible phonemes which may represent the word or words spoken by the user. In a sense, then, the input into the unit 31 comprises not only the phonemes representing the actual spoken words but also those representing variations of the spoken words. Therefore, when the unit 31 parses or compares these phonemes or word strings to a stored grammar, it is comparing not only the spoken word but also variations of the spoken word against the grammar. Ultimately, the unit 30 is adapted to output a tentative or hypothetical listing of web sites which contain not only the spoken word but also variations of the spoken word. As stated before, unit 31 can be adapted to both compare and parse the possible phonemes against a grammar. Greatly simplified, comparison comprises matching a possible phoneme to all of the words or phonemes in a grammar regardless of how the original word (i.e., text) was used in the web site. That is to say, the comparison function ignores the "context" of how the word is used. As a result, the comparison function may identify literal matches which are worth very little. In contrast, parsing takes into consideration the "part-of-speech" identifiers which may be included in a grammar. By so doing, only those web sites which contain words used in a correct context will be identified as a match (for a further discussion of parsing see "Parsing Natural Language," Margaret King, Academic Press, 1983, all chapters, and "Syntactic Pattern Recognition and Applications," King Sun Fu, Prentice Hall, 1982, Chapter 7).

It should be understood that the parsing and comparison functions carried out by the unit 31 occur in real-time. That is, during the course of a few seconds the unit 31 may be comparing and/or parsing hundreds or thousands of phonemes associated with a few words to a grammar. Each time, the unit 31 is adapted to generate a listing of tentative partial, or probable (collectively "probable" matches) matching phonemes. Eventually, the user stops talking and nothing else is input into the unit 31. In an illustrative embodiment of the present invention, at this time the unit 31 is adapted to generate a set of probable matching phonemes which will eventually be used to generate a list of probable web site addresses.

Because the present invention envisions parsing and/or comparing grammars comprising both N-grams and cohorts, the present inventors believe there is a greater chance that one of the web sites searched by the spider will contain a word which matches, or otherwise correlates to, one spoken by a user.

As noted above, the unit 31 generates a set of probable, matching phonemes which represent not only the words spoken by the user but also variations of the words. This gives the methods and systems envisioned by the present invention the capability of not only locating web sites which contain the exact words spoken by a user but also web sites which contain words which are associated with the same idea generated by the spoken words. For example, a user may wish to initiate a search using the phrase "all cars that are blue in Virginia". In an illustrative embodiment by the present invention, the unit 30 is adapted to identify not only web sites which contain those exact words but also those that contain slight variations of those words. For example, unit 30 may generate a list of web sites, one of which may contain the words "an automobile that is blueish green located in Virginia".

In an illustrative embodiment of the present invention, the web site address generator 32 is adapted to receive the list of probable matching phonemes, to extract the web site addresses associated with the matches, and to output these addresses via pathway 34 so that they can be communicated to the individual who initiated the search. Though shown as a separate units, it should be understood that the comparison/parsing unit 31 and address generator 32 may be combined into one. Additionally, it should be understood that the generation of probable, matching phonemes and corresponding web site addresses may occur substantially simultaneously.

Despite the flexibility of the methods and systems described above, there may be a case where the unit 30 cannot identify any web sites which contain words that match the words spoken by a user. In this event, the unit 30 is adapted to instruct the generator 3 to generate either a phoneme or word grammar which comprises either synonyms or conjugates of the N-grams and cohorts. That is, if the unit 30 cannot identify any web sites containing words which closely match the words spoken by a user or a variation of those words, the unit 30 can request that generator 3 provide it with a substitute word or phoneme grammar. This substitute grammar would still comprise N-grams and cohorts but the N-grams and cohorts would be synonyms or conjugates of the original N-grams or cohorts. Again, this makes the methods and systems envisioned by the present invention more flexible. Not only will the unit 30 attempt to locate web sites from within a stored grammar which contain the exact words spoken by a user or variations of those words but it will also attempt to locate web sites which contain synonyms or conjugates of the spoken words. In this manner, the present invention goes to great length in order to identify web sites which contain words which convey the same idea as the words spoken by a user.

An example of how this flexibility becomes important when it comes to conducting a speech-based Internet search is as follows. Suppose that an individual wishes to search a group of web sites that she has visited before. She is aware of the general content of the web sites but cannot recall the exact words or sequence of words used in the web sites. Yet, she must launch a search using some key words. The present invention allows her to launch a search using a paraphrase of the words she has previously read that conveys the same idea. Though her search will not exactly match the words or sequence of words in the web site she desires, the present invention makes it possible to locate the web site nonetheless. In comparison, existing speech-based techniques cannot locate the same web site without having a user input the exact (or a close approximation of) sequence of words actually contained in the web site.

In yet another embodiment of the present invention, the unit 31 can be adapted to receive both a word and phoneme grammar.

Together, the speech recognition unit 30 and grammar generator unit 3 comprise a flexible speech-based, Internet search system.

In addition to the functions and features of units 3,30 discussed above, these units may also comprise a number of database structures.

Figure 3:
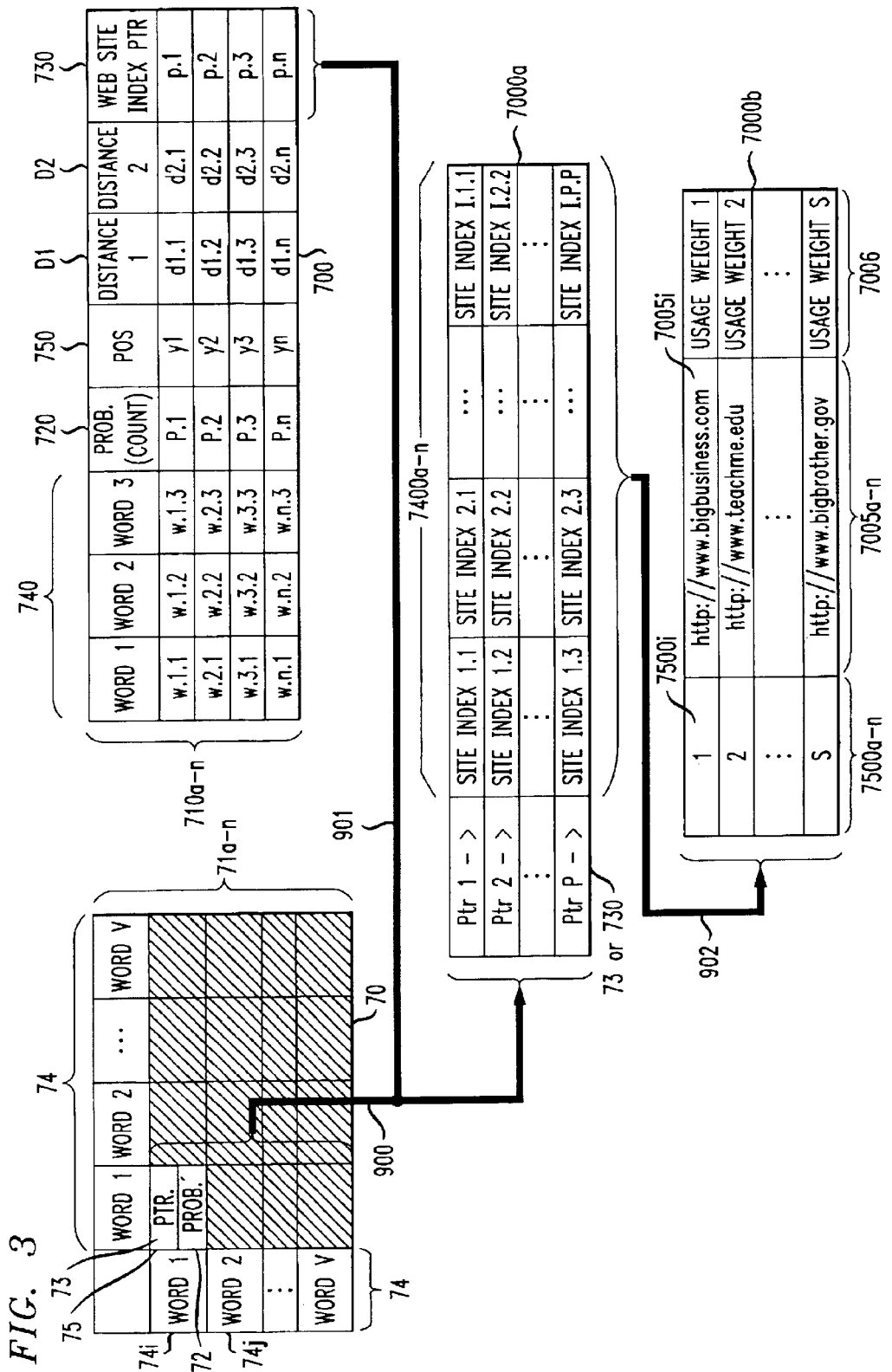
FIG. 3 depicts databases structured according to embodiments of the present invention.

For example, either merging unit 7,8 may comprise a grammar database ("database"). The database in turn may comprise a number of different databases. FIG. 3 depicts some examples of such databases.

Referring to FIG. 3, there is shown a database 70 adapted to store a merged grammar, in this case a word grammar, according to one embodiment of the present invention. The database 70 shown in FIG. 3 was generated using an N-gram and an N-way cohort equal to 2 (i.e., N=2). It should be understood that the present invention envisions the generation of databases based upon any size (or number) N-gram and cohort. A two-dimensional N-gram/cohort was selected for illustration purposes only, because it is possible to depict such a database in two dimensions. It would be more difficult to depict databases for higher numbered N-grams/cohorts (i.e., when N=3, the database would be a cube, etc.).

The merged grammar within database 70 comprises a plurality of cells, one of which is the cell labeled 75. In one embodiment of present invention each cell is adapted to store two different values: a "probability" value 72 (abbreviated "prob." in FIG. 3) and a web site index pointer 73 (abbreviated "ptr").

The probability value 72 is associated with one or more words 74 and represents the probability that one word 74$i$ found by the spider ("Word 1" in database 70) will occur within a proximity of a second word 74$j$ (e.g., "Word 2"). The probability value 72 is derived from merging an N-gram and N-way cohort. In an illustrative embodiment of the invention, the probability value comprises a word "count". In general, a word count represents the number of times a word occurs within the proximity of one or more other words (e.g., words from web sites that are searched using a spider or the like). A merging unit, like unit 7, can be adapted to generate a probability based on this word count. Storing word counts instead of probabilities is believed to be more efficient because it is easier to update a count than a probability.

In yet another embodiment of the invention, the probability value can be represented by a floating point number.

Eventually, database 70 must be used to complete speech-based, Internet searches. Keeping this in mind, database 70 must correlate the identities of web sites queried by the spider to the probability values (e.g., N-grams or cohorts) of words found therein. Thus, the second value stored in each cell is a web site index pointer 73 which may be associated with one or more words 74. A web site index pointer is one way to identify a web site.

It should be understood that pointers, such as pointer 73, are not the actual addresses of web sites. Instead, to conserve space in database 70, an "index" (i.e. unique identifier or value) is assigned to a group of web sites which share common words. For example, the phrase "the quick brown fox" may appear in many web sites. As a result, the same words, word counts and probabilities would be generated for more than one web site. Instead of storing the complete character string (i.e., complete web site address) for each web site, the sites are grouped together and identified by a unique "index" pointer, such as pointer 73. The advantage of storing a pointer instead of individual, web site addresses again relates to conserving memory space, among other things. Some web site addresses may be 60 to 100 characters in length. Such a character string takes up an appreciable amount of space in memory, compared to the space needed to store a pointer.

Database 70 is only one of the database structures which may be used to store a merged grammar according to the present invention. It can be seen from FIG. 3 that some of the cells in database 70 are empty (shaded cells). These empty cells represent instances where a certain word did not occur within the proximity of another word. It is highly inefficient to store empty cells because such cells take up space in database 70. Realizing this, the present invention envisions an alternative database structure which makes more efficient use of space in such a sparsely filled database.

FIG. 3 depicts an alternative database 700. The database 700 is a compressed version of a type of database like database 70. It is not an exact, compressed version of the database 70 because the database 700 is based on a three-way N-gram instead of a two-way N-gram. It can be said that the database 700 comprises a compressed version of a cubic database, instead of a two-dimension database like database 70.

In one embodiment of present invention, database 700 is structured as follows. Similar to non-compressed database 70, database 700 is adapted to store web site index pointers 730 and probability values or word counts 720 which are associated with words 710$a$–$n$. Unlike database 70, the cells in database 700 are all substantially full.

Database 700 also depicts other features of the present invention. For example, the present inventors believe that by measuring the distance between words in a grammar, more accurate search results are obtained. That is, when recognizer 30 uses a database of a merged grammar that has been structured to include measured distances, the search results are more accurate. In general, the "wider" the distance between words the greater the probability that a given web site will contain such a combination of words and be identified during a search. However, greater distances also increase the chances that the combinations are irrelevant to a given search. Therefore, in one embodiment of the present invention, a merging unit 7, 8 can be adapted to generate distances d1.1 and d2.1 by ignoring words associated with any distance which exceeds a threshold distance, where distance d2.1 comprises the distance between Words 1 and 2 in database 700, for example.

The notation "w.1.1.1" in database 700 is one way to indicate a word combination (e.g. "w.1.2" is the second word of the first group of three words occurring together).

Another feature illustrated by database 700 is the storage of "part of speech" ("POS") identifiers 750. It is these identifiers which are generated and used by the recognition unit 30 as described before. Though the identifiers 750 are shown as a part of database 700, they may also be a part of database 70 as well.

Before going further, it should be understood that although only four databases or database structures are shown in FIG. 3, the invention is not so limited. To the contrary, any number of database/database structures, comprising one or more words/phonemes, a probability value associated with each of the one or more words/phonemes, and a pointer associated with each of the one or more words/phonemes, are envisioned by the present invention.

It should be understood that a database structured as either database 70 or 700 may be used depending on whether a small or large number of empty cells can be accommodated in the memory of a database.

Regardless of the structure used, each one is further associated with a site index database 7000$a$ (see FIG. 3) which may also be a part of merging unit 7 or 8.

As envisioned by the present invention, a merging unit (e.g., unit 7 in FIG. 2) is adapted to generate both a grammar database 70, 700 and a site index database 7000$a$. As illustrated by arrows 900, 901 in FIG. 3, the merging unit is further adapted to select one or more site indices 7400$a$–$n$ associated with a pointer 73 or 730.

Though pointers 73, 730 are shown as if they are being stored in database 7000$a$ this need not be the case. Typically, database 7000*a* would only comprise indices 7400*a–n*. Pointers 73, 730 in database 7000*a* are shown only to illustrate the fact that each pointer 73, 730 is associated with, or "points to", one or more site indexes 7400*a–n*. As indicated before, one word may be found in a number of web sites. In an illustrative embodiment of the invention, each site index 7400*a–n* (i.e., Site Index 1.1, Site Index 2.1, ... where, I1.1 is the count or number of web site indices for pointer 1, and I2.2 is the count or number of web site indices for pointer 2, etc. ... ) represents one or more web site addresses. That is, the site indexes are not web site addresses. Rather, they comprise yet another unique identifier which represents a group of web sites.

In some sense, the indices 7400*a–n* function like pointers 73, 730. In an illustrative embodiment of the invention, each index 7400*a–n* points to one or more web sites 7005*a–n* shown in database 7000*b* (which may also be a part of merging unit 7 or 8) as illustrated by arrow 902.

The indices 7400*a–n* are also shown as indices 7500*a–n* in database 7000*b*. Again, it should be understood that normally indices 7500*a–n* are not stored as a part of database 7000*b*. They are being shown as such to make it clear that each index 7400*a–n* is associated with, or points to, one or more web site addresses 7005*a–n*. For example, Site index 1 is associated with web site http://www.big business.com 7005*i*.

Earlier in this discussion it was mentioned that generating a grammar might include the elimination of unpopular web sites. In an illustrative embodiment of the present invention, database 7000*b* is further adapted to store "Usage Weights" 7006. These weights 7006 indicate the relative traffic flow of a specific web site 7005*a–n*. The lower the traffic flow, the greater the possibility that the usage weight will indicate that the web site associated with such an address should not be considered by upon generating a grammar.

This process of "ignoring" web sites with low traffic flows may be completed at different times other than during the generation of a grammar. For example, if a merging unit is adapted to include words or phonemes from such sites during grammar generation, a recognizer unit may be adapted to ignore such sites during an actual search.

Ultimately, a recognition unit, like recognition unit 30, can make use of the grammar databases shown in FIG. 3 to identify the addresses of those web sites from within a generated grammar which have some correlation to words making up a speech-based search. According to one embodiment of the invention, upon initiation of a speech-based, Internet search a recognizer unit is adapted to compare and/or parse phonemes against the content of merging units 7 or 8, such as the content in database 70 or 700. From this comparison a set of pointers 73 or 730 are selected. Thereafter, the unit 30 is further adapted to locate indices 7400*a–n* associated with the selected pointers 73, 730. After this, the unit 30 is adapted to select one or more web site addresses 7005*a–n* associated with the located indices 7400*a–n*. These addresses 7005*a–n* are those that contain words that have some correlation to words making up a speech-based search. It should be understood that some or all of the functions just mentioned to query databases 70, 700, 7000*a* and/or 7000*b* may be carried out by the unit 30, a merging unit 7, 8 or some combination of the two.

It should be understood that databases 70, 700 may also comprise a merged phoneme grammar as well. In this case, the "words" (e.g., words 74 in database 70) are replaced with phonemes. As mentioned before, phoneme-based grammars typically require a larger database (i.e., more memory space) because, relatively speaking, phonemes or phoneme strings are longer than word or word strings.

The present inventors have attempted to estimate the approximate size of a database comprising a merged word grammar. Referring to FIG. 4, there is shown a table which approximates the size of such a database for 1, 2 and 3-way N-grams. The first column in FIG. 4 lists the number of actual words (i.e., an English vocabulary) which may be used to form some part of an Internet search. To create a database for a one-way N-gram would require 50,000 cells as indicated by the number "50K" shown under the second column labeled "N=1". Similarly, a database would require 2.5 billion cells for a two-way N-gram and 125 trillion cells for a three-way N-gram as indicated by the values "2.5G" and "125T," under the columns labeled "N=2" and "N=3," respectively.

Referring now to FIG. 5 there is depicted a thesaurus database 10*a* comprising synonyms 10*c* and/or conjugates 10*d*. As mentioned before, there may occur instances when no matches for a spoken word are initially found by unit 30. In this instance, unit 3 is adapted to generate a substitute grammar comprising N-grams and/or cohorts based on a synonym or conjugate form of the original grammar. For example, one of the conjugate forms of the word drove namely "drive, driving, driven" may be used instead of drove. In an illustrative embodiment of the present invention, database 10*a* may be part of a thesaurus unit, such as unit 11 shown in FIGS. 1 and 2.

It should be understood that the grammars generated by the present invention are dynamic (i.e., ever-changing). Each time the generators 4,5 or TTS 6 retrieves words from the database 2 new N-grams and cohorts are generated (or at least the old ones are modified). These form the basis for the generation of modified or new grammars which can then be used in subsequent searches.

The discussion above has sought to explain the ideas underlying the present invention by giving some examples/embodiments which may be used to realize the present invention. Others may be envisioned. For example, though the units in FIGS. 1 and 2 are shown as separate units, they may be combined into fewer units or further broken down into additional units. Similarly, though the databases in FIGS. 3–5 are shown as separate databases, it should be understood that one or more of them may be combined or further broken down into additional databases. In addition, the units and/or databases may be realized in electronic memory, processors or the like. Further, some elements of a database such as conjugates 10*d*, may be made a part of a separate database or another database 70, 700. Further still, it should be understood that the features and functions of the present invention may be carried out by one or more programmed mediums, such as a magnetic storage device, floppy disc, optical CD, digital storage device, digital signal processor, microprocessor, or the like. The medium can be adapted to store one or more programs and associated program code for carrying out the features and functions of the present invention.

For example, the grammar generator 3 may comprise a Unix based "shell" script for generating and/or updating N-grams or cohorts.

Further variations of the invention may be envisioned without departing from the spirit and scope of the present invention as defined by the claims which follow.

We claim:

1. A method for enabling a speech-based, Internet search for generating alternative web sites, comprising:

generating a cohort in a cohort generation unit;
generating a language in a generation unit;
generating a merged grammar by combining the cohort and the language in a merging unit,
wherein the cohort is a cohort probability indicating a number of times a word will occur in a first range, wherein the language is a language probability indicating a number of times a word will occur in a second range, the first range being greater than the second range.

2. The method as in claim 1 wherein the language comprises an N-gram language.

3. The method as in claim 1 wherein the language comprises a finite state language.

4. The method as in claim 1 wherein the language comprises a context free grammar.

5. The method as in claim 1 wherein the language comprises a context sensitive language.

6. The method as in claim 1 wherein the grammar comprises a phoneme grammar.

7. The method as in claim 1 wherein the grammar comprises a word grammar.

8. The method as in claim 1 wherein generating the cohorts and language further comprises eliminating cohorts and parts of the language which are associated with web sites having low traffic flow.

9. The method as in claim 1 further comprising deleting repetitive cohorts or repetitive parts of the language.

10. The method as in claim 1 further comprising generating the cohorts and language from phonemes.

11. The method as in claim 1 further comprising:
comparing a phoneme associated with a spoken word against the merged grammar.

12. The method as in claim 11 wherein the merged grammar comprises one or more synonyms.

13. The method as in claim 11 wherein the merged grammar comprises one or more conjugates.

14. The method as in claim 11 wherein the merged grammar comprises part of speech identifiers.

15. The method as in claim 11 further comprising generating information correlated to the spoken word.

16. The method as in claim 15 wherein the information comprises a web site address.

17. The method as in claim 1, further comprising the steps of generating distances between words, and ignoring words associated with any distance which exceeds a threshold distance.

18. A system for enabling a speech-based, Internet search for generating alternative web sites, comprising:
a cohort generator adapted to generate cohorts;
a language generator adapted to generate a language; and
a merging unit adapted to generate a merged grammar by combining the cohorts and the languages,
wherein the cohort is a cohort probability indicating a number of times a word will occur in a first range, wherein the language is a language probability indicating a number of times a word will occur in a second range, the first range being greater than the second range.

19. The system as in claim 18 wherein the language comprises an N-gram language.

20. The system as in claim 18 wherein the language comprises a finite state language.

21. The system as in claim 18 wherein the language comprises a context free language.

22. The system as in claim 18 wherein the language comprises a context sensitive language.

23. The system as in claim 18 wherein the grammar comprises a phoneme grammar.

24. The system as in claim 18 wherein the grammar comprises a word grammar.

25. The system as in claim 18 further comprising a statistical unit adapted to eliminate cohorts and parts of the language associated with web sites having low traffic flow.

26. The system as in claim 18 further comprising an optimization unit adapted to delete repetitive cohorts or repetitive parts of the language.

27. The system as in claim 18 further comprising:
a recognition unit adapted to compare a phoneme associated with a spoken word against the merged grammar.

28. The system as in claim 27 wherein the grammar comprises one or more synonyms.

29. The system as in claim 27 wherein the grammar comprises one or more conjugates.

30. The system as in claim 27 wherein the grammar comprises part of speech identifiers.

31. The system as in claim 27 wherein the recognition unit is further adapted to generate information correlated to the spoken word.

32. The system as in claim 31 wherein the information comprises a web site address.

33. The system as in claim 18, wherein the merging unit is adapted to generate distances between words and to ignore words associated with any distance which exceeds a threshold distance.

34. A programmed medium for enabling a speech-based, Internet search for generating alternative web sites, adapted to:
generate cohorts in a cohort generating unit;
generate a language in a language generating unit; and
generate a merged grammar by combining the cohorts and language in a merging unit,
wherein the cohort is a cohort probability indicating a number of times a word will occur in a first range, wherein the language is a language probability indicating a number of times a word will occur in a second range, the first range being greater than the second range.

35. The programmed medium as in claim 34 wherein the language comprises an N-gram language.

36. The programmed medium as in claim 34 wherein the language comprises a finite state language.

37. The programmed medium as in claim 34 wherein the language comprises a context free language.

38. The programmed medium as in claim 34 wherein the language comprises a context sensitive language.

39. The programmed medium as in claim 34 further adapted to eliminate cohorts and parts of the language associated with web sites having low traffic flow.

40. The programmed medium as in claim 34 further adapted to delete repetitive cohorts or repetitive parts of the language.

41. The programmed medium as in claim 34 further adapted to compare a phoneme associated with a spoken word against the merged grammar.

42. The programmed medium as in claim 41 wherein the grammar comprises one or more synonyms.

43. The programmed medium as in claim 41 wherein the grammar comprises one or more conjugates.

44. The programmed medium as in claim 41 wherein the grammar comprises one or more part of speech identifiers.

45. The programmed medium as in claim 41 further adapted to generate information correlated to the spoken word.

46. The programmed medium as in claim 45 wherein the information comprises a web site address.

47. The programmed medium as in claim 34 wherein the medium comprises a magnetic storage medium.

48. The programmed medium as in claim 34 wherein the medium comprises a CD.

49. The programmed medium as in claim 34, wherein the medium comprises a digital storage device.

50. The programmed medium as in claim 34, wherein the merging unit is adapted to generate distances between words and to ignore words associated with any distance which exceeds a threshold distance.

* * * * *